US006020889A

United States Patent [19]
Tarbox et al.

[11] Patent Number: 6,020,889
[45] Date of Patent: Feb. 1, 2000

[54] SYSTEM FOR DISPLAYING A COMPUTER MANAGED NETWORK LAYOUT WITH VARYING TRANSIENCE DISPLAY OF USER SELECTED ATTRIBUTES OF A PLURALITY OF DISPLAYED NETWORK OBJECTS

[75] Inventors: Brian James Tarbox, Littleton, Mass.; Bethany Rose Scaer, Nashua, N.H.; Jeffrey Phillip Snover, Austin, Tex.

[73] Assignee: International Business Machines Corporation, Armonk, N.Y.

[21] Appl. No.: 08/971,252

[22] Filed: Nov. 17, 1997

[51] Int. Cl.$^7$ .............................. G06F 3/14; G06F 11/32
[52] U.S. Cl. ...................... 345/356; 345/334; 345/347; 345/339; 345/969; 709/223
[58] Field of Search ................................... 345/349, 969, 345/348, 356, 970, 347, 339, 145, 333, 334; 395/200.53, 200.54

[56] References Cited

U.S. PATENT DOCUMENTS

| | | | |
|---|---|---|---|
| 5,295,244 | 3/1994 | Dev et al. | 395/161 |
| 5,353,399 | 10/1994 | Kuwamoto et al. | 395/159 |
| 5,471,399 | 11/1995 | Tanaka et al. | 364/491 |
| 5,483,631 | 1/1996 | Nagai et al. | 345/329 |
| 5,684,988 | 11/1997 | Pitchaikani et al. | 707/104 |
| 5,734,372 | 3/1998 | Verstockt | 345/163 |
| 5,742,768 | 4/1998 | Gennaro et al. | 295/200.33 |
| 5,751,965 | 5/1998 | Mayo et al. | 395/200.54 |
| 5,764,913 | 6/1998 | Jancke et al. | 395/200.54 |

*Primary Examiner*—Raymond J. Bayerl
*Assistant Examiner*—Cuong T. Thai
*Attorney, Agent, or Firm*—Jeffrey S. LaBaw; Jerry Kratt

[57] ABSTRACT

A computer managed communication network with user interactive access via a plurality of display terminals and including a plurality of network objects, each respectfully associated with one of a plurality of linked network nodes. The network includes means such as databases for storing data representing attributes of network objects. There is graphically displayed on at least one of said display terminals, at least a portion of said linked network nodes and associated objects. In addition, there is a user interactive implementation for activating for each of a plurality of objects, a transient display of a selected attribute of said object proximate to said object during a period of common transience. The system further includes user interactive means for varying the period of transience of each of said transient displays whereby the attribute values of a variety of objects may be compared to each other without unduly cluttering the display interface.

24 Claims, 8 Drawing Sheets

SYSTEM FOR DISPLAYING A COMPUTER MANAGED NETWORK LAYOUT WITH VARYING TRANSIENCE DISPLAY OF USER SELECTED ATTRIBUTES OF A PLURALITY OF DISPLAYED NETWORK OBJECTS

CROSS-REFERENCE TO RELATED COPENDING PATENT APPLICATIONS

The following two patent applications which have the same inventorship as the present invention and are assigned to a common assignee cover subject matter related to the subject matter of the present invention: A SYSTEM FOR DISPLAYING A COMPUTER MANAGED NETWORK LAYOUT WITH TRANSIENT DISPLAY OF USER SELECTED ATTRIBUTES OF DISPLAYED NETWORK OBJECTS, R. R. Scaer et al., (Attorney No. AT9-97-525) and A SYSTEM FOR DISPLAYING A COMPUTER MANAGED NETWORK LAYOUT WITH A FIRST TRANSIENT DISPLAY OF A USER SELECTED PRIMARY ATTRIBUTE OF AN OBJECT AND A SUPPLEMENTARY TRANSIENT DISPLAY OF SECONDARY ATTRIBUTES, R. R. Scaer et al., (Attorney No. AT9-97-524).

TECHNICAL FIELD

The present invention relates to computer managed communication networks and particularly to computer controlled user interactive display terminals for graphically displaying portions of such networks including linked nodes and associated network objects.

BACKGROUND OF THE INVENTION

The 1990's decade has been marked by a societal technological revolution driven by the convergence of the data processing industry, the communications industry and the consumer electronics industry. This advance has been even further accelerated by the extensive consumer and business involvement in the internet over the past two years. It seems as if virtually all aspects of human endeavor in the industrialized world will potentially involve human-computer interfaces, and especially such interfaces to communication networks such as the internet. As a result of these profound changes, there is a need to make computer directed activities accessible to a substantial portion of the world's population which, up to a year or two ago, was computer-illiterate, or at best computer indifferent. In order for the vast computer supported market places to continue and be commercially productive, it will be necessary for a large segment of computer indifferent consumers, workers and business people to be involved in computer interfaces. In addition because of the vast amount of information potentially available through networks such as the internet, there has been an increasing demand on the part of relatively sophisticated users for implementations which make display terminal access to the internet less cluttered and confusing and of course easier to use.

The present invention is directed to the problems of providing less cluttered and easier graphical display access to communication network nodes, objects associated with such nodes as well as the attributes of such objects. In order to solve such problems, the above mentioned SYSTEM FOR DISPLAYING A COMPUTER MANAGED NETWORK LAYOUT WITH TRANSIENT DISPLAY OF USER SELECTED ATTRIBUTES OF DISPLAYED NETWORK OBJECTS, R. R. Scaer et al., application makes use of transient displays in which user selected attributes of such nodes and objects may be displayed. The present invention relates to circumstances where an attribute common to a plurality of displayed objects needs to be displayed in a plurality of common transient displays respectively associated with said plurality of objects for comparison of attributes and similar purposes. The present invention does this while keeping display screen clutter to a minimum.

SUMMARY OF THE INVENTION

The present invention relates to a computer managed communication network with user interactive access via a plurality of display terminals and including a plurality of network objects, each respectfully associated with one of a plurality of linked network nodes. The network includes means such as databases for storing data representing attributes of network objects. Means are provided for graphically displaying on at least one of said display terminals, at least a portion of said linked network nodes and associated objects. In addition, there is provided user interactive means for activating for each of a plurality of said displayed objects, a respective transient display of a selected attribute of said displayed object proximate to said object during a period of common transience, i.e. the time periods of such transient displays overlap each other thereby permitting a comparison of attribute values for said objects. User interactive means are provided for selecting the attribute, the value of which is to be displayed in the display of common transience.

In accordance with an important aspect of this invention, the period of transience for each of said transient displays may be user interactively varied so that attribute values of associated objects may be compared without strict regard to the order in which the transient displays were activated.

It should be noted that the stored data representing the object attributes is not necessarily stored static data. The data storage means for providing the selected attributes may be dynamic, i.e. the selected data attributes may calculated when selected or the attribute values may be dynamically combined from several databases.

DETAILED DESCRIPTION OF THE PREFERRED EMBODIMENT

Figure 1:
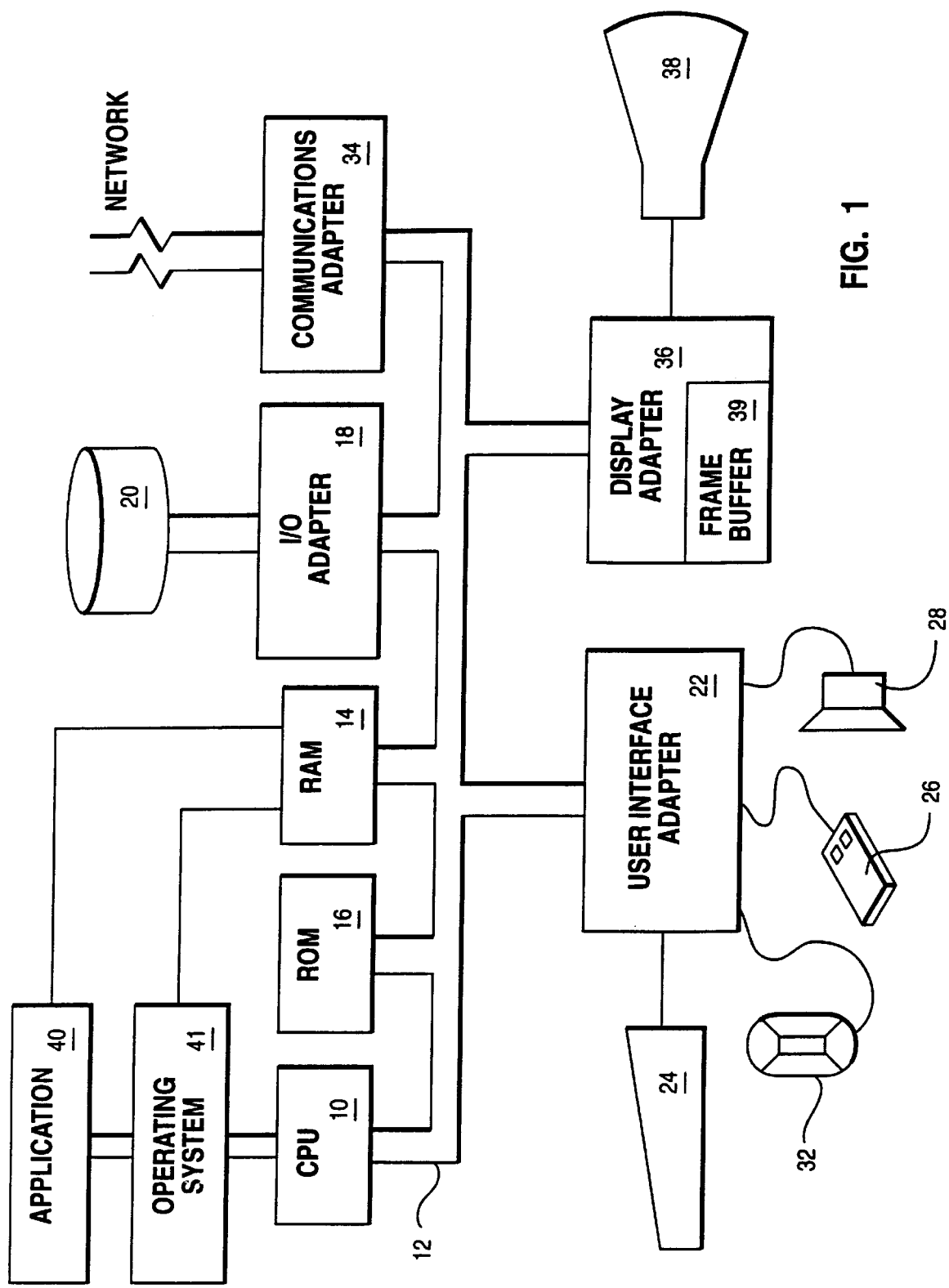
FIG. 1 is a block diagram of a data processing system including a central processing unit which is capable of implementing the transient display of the present invention.

Before going into the details of specific embodiments, it will be helpful to understand from a more general perspective the various elements and method which may be used to implement the present invention. Since the present invention is directed to transient display expedients to improve the user-friendliness of graphical display interfaces to network object attributes, we will not go into great detail in describing the networks to which the present invention is applicable. U.S. Pat. Nos. 5,295,244, Dev et al. and 5,353,399, Kuwamoto et al. adequately detail conventional networks to which the present invention would be applicable including appropriate network management and display terminal access to such networks. Reference has also been made to the applicability of the present invention to a global network such as the internet. For details on internet nodes, objects and links, reference is made to the text, *Mastering the Internet*, G. H. Cady et al., published by Sybex Inc., Alameda, Calif., 1996.

Any data communication system which interconnects or links computer controlled systems or network objects at various sites or network nodes defines a communications network. A network may be as simple as two linked computers or it may be any combination of LANS (Local Area Networks) or WANS (Wide Area Networks). Of course, the internet is a global network of a heterogeneous mix of computer technologies and operating systems. At each level in a network hierarchy, the unit may considered as a network object. For example, since the internet connects networks of computers, a particular corporate network could be an internet object. Then, the particular LAN of each department in the corporate network would be an object. At high levels, regional networks representative of cities could be objects. Likewise, computer controlled objects could be linked together by function to form networks which in turn could be linked into the internet backbone as network objects characterized by functions as accounts receivable/payable or video-on-demand distribution. Higher level objects are linked to the lower level objects in the hierarchy through a variety of network server computers. For example, a video-on-demand distribution network could comprise several video server repository sites each having its unique collection of stored films; each of the sites would be network objects and the video distribution network itself would be an object on the internet. Of course at each level in the hierarchy, each object is associated with its own node.

In the subsequent, more specific descriptions of the preferred embodiment, the attributes and the storage of attributes will be discussed. It will be understood that the data representing particular object attributes or the data from which such particular attributes may be calculated dynamically may be stored in association with the object itself, a computer server managing the object or in a broad database associated with the overall network management.

In addition, for convenience in description of the operation of the various transient display implementations of the present invention, some simple object attributes may be used. It will be understood, that the implementations should be equally applicable in the reading of more complex attributes.

Referring to FIG. 1, a typical data processing system is shown which may function as the computer controlled display terminal used in implementing the transient display functions in the present invention. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as DOS, or the OS/2 operating system available from International Business Machines Corporation (OS/2 is a trademark of International Business Machines Corporation). A programming system application 40 to be subsequently described in detail runs in conjunction with operating system 41 and provides output calls to the operating system 41 which implement the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and the application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN) which includes of course the internet. I/O devices are also connected to system bus 12 via user interface adapter 22 and display adapter 36. Keyboard 24, trackball 32, mouse 26 and speaker 28 are all interconnected to bus 12 through user interface adapter 22. It is through such input devices that the user interactive functions involved in the transient displays of the present invention may be implemented. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38. In the preferred embodiment, which will be subsequently described, the mouse will be the input means through which the used will interface with the system. the display terminal of FIG. 1 communicates with the network such as the internet through communications adapter 34.

Figure 2:
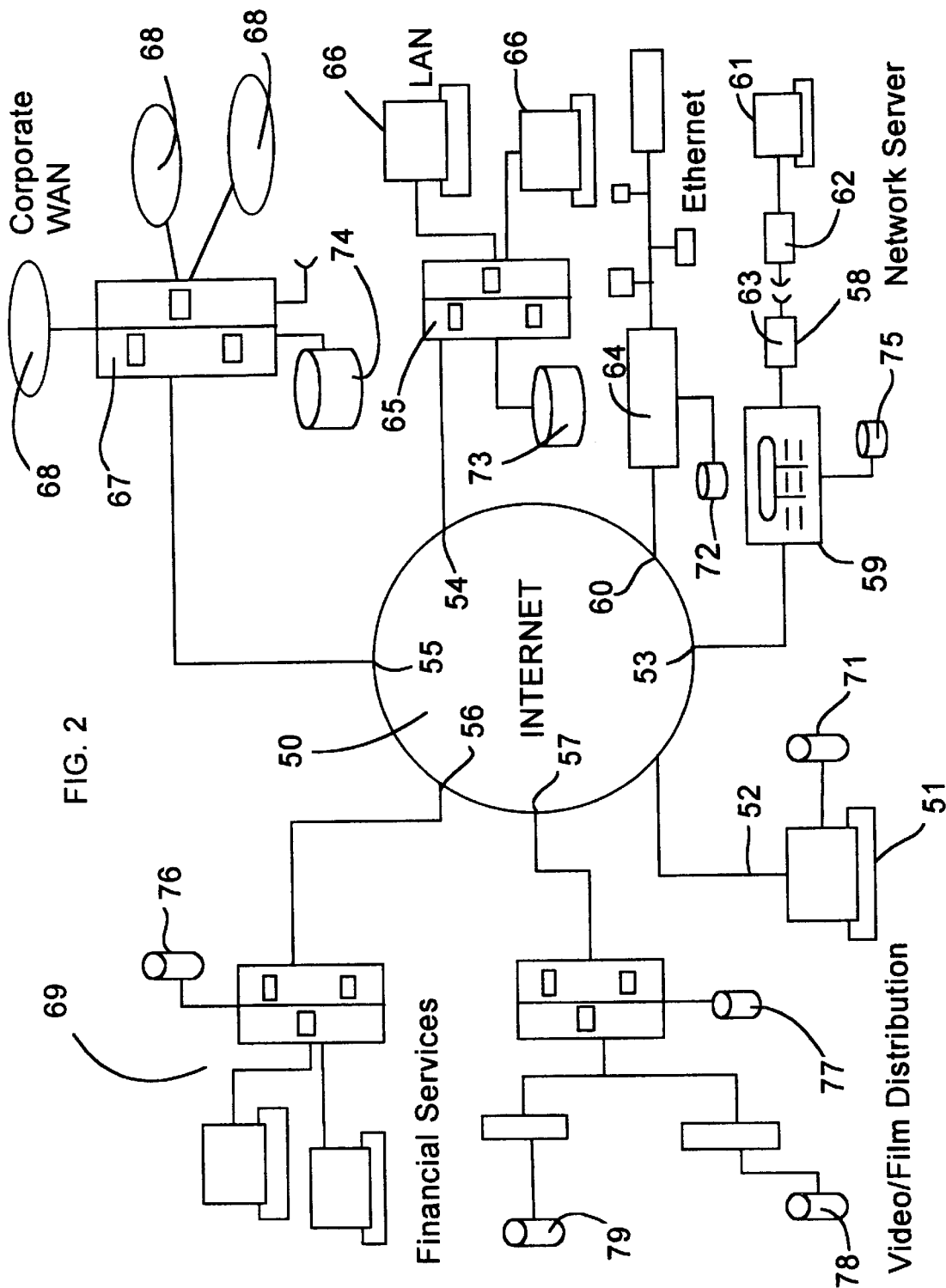
FIG. 2 is a generalized diagrammatic view of an internet portion upon which the present invention may implemented.

A generalized diagram of a portion of an internet to which the computer controlled display terminal 51 used for the transient display of the present invention is shown in FIG. 2. Terminal 51 is the computer system shown in FIG. 1 and connection 52 (FIG. 2) is the network connection shown in FIG. 1. Some typical major objects connected to the net are user network 58 connected through server 59 at node 53. In such a server network, the individual users' workstations 61 are connected through telephone modems 62 and 63 to the server 59. Of course at the next level, each of the user workstations 61 may be considered as network objects. Among the other illustrative network objects are ethernet 64 at node 60 and a LAN at node 54 consisting of server 65 and workstations 66. At node 55, the connected object is a corporate WAN consisting of network server 67 and sub-networks 68. In addition, functional networks such as financial services network 69 and video/film distribution network 70 may be considered as objects, respectively connected at nodes 56 and 57. It should be noted that a variety of databases, 71 through 79 are shown respectively associated with network objects at various levels. These databases represent the various locations and repositories at which attributes and attribute values which may be transiently displayed in accordance with the present invention are stored. Thus, when the obtaining or fetching of attributes values are subsequently described, it should be understood that they may be obtained from such databases or combination of databases throughout the network using any conventional network expedient for obtaining data.

There will now be described a simple illustration of the present invention with respect to the display screens of FIGS. 3 through 6. When the screen images are described, it will be understood that these may be rendered by storing an icon creation program such as those in Windows 95 or OS-2 operating systems in the RAM 14 of the system of FIG. 1. The operating system is diagrammatically shown in FIG. 1 as operating system 41.

An embodiment of the present invention will be described commencing with the display screen shown in FIG. 3. This initial display screen is presented to the viewer on display monitor 38 of FIG. 1. In accordance with conventional techniques, the user may control the screen interactively through a conventional I/O device such as mouse 26 of FIG. 1 which operates through user interface 22 to call upon programs in RAM 14 cooperating with the operating system 41 to create the images in frame buffer 39 of display adapter 36 to control the display on monitor 38.

Figure 3:
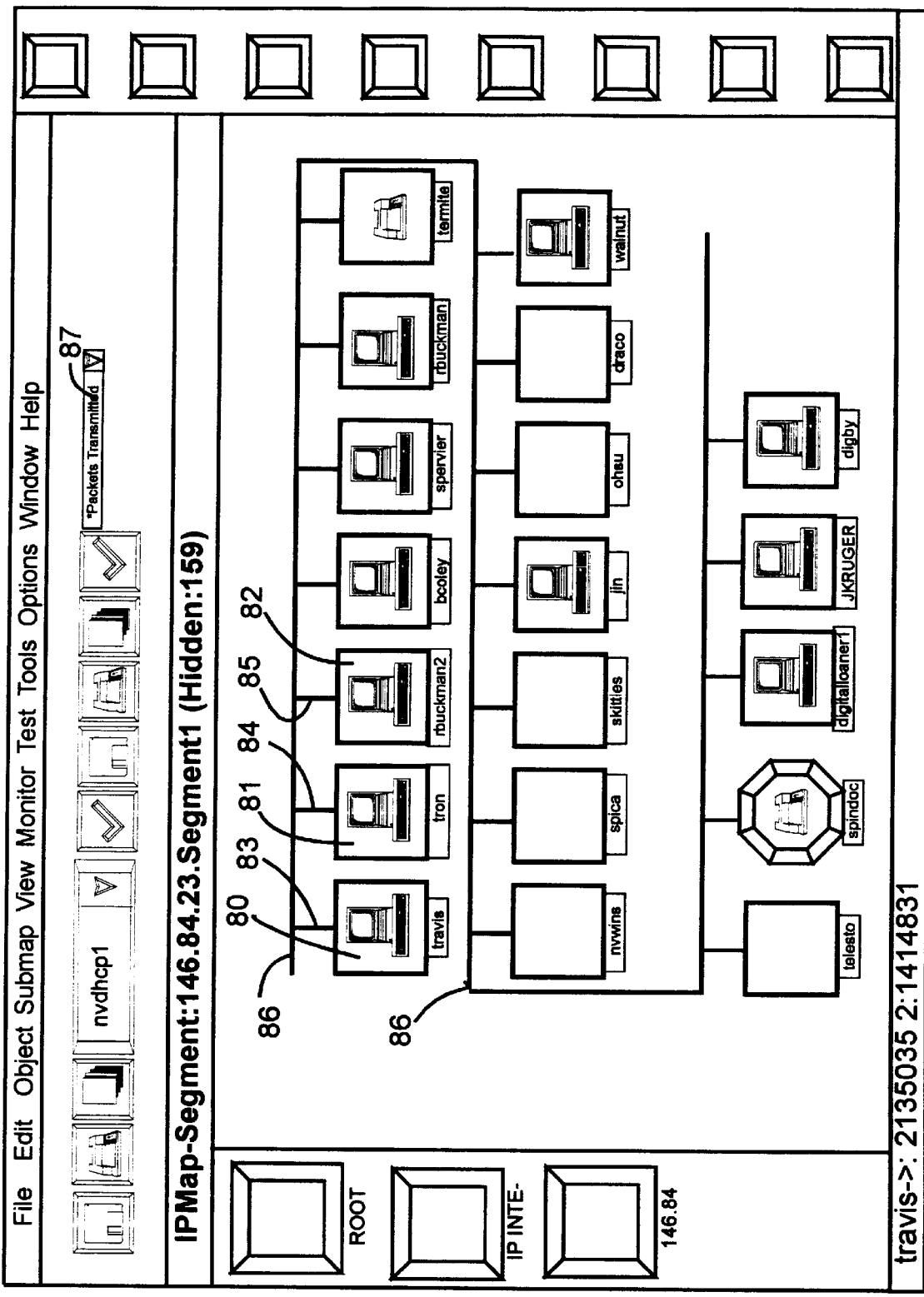
FIG. 3 is a diagrammatic view of a display screen on which a network portion is graphically represented.

The initial display screen of FIG. 3 shows a graphic representation of a portion of a network in which network objects are represented as icons such as objects 80, 81, and 82 respectively connected at node representations 83, 84 and 85 to network bus representation 86. In the display screen shown, an attribute is selected by clicking on attribute window 87 by a user interactive I/O device such as mouse 26, FIG. 1. This scrolls through a menu of attributes from which the user selects the attribute which in the present case is "Packets Transmitted". Now, the user must select one of the objects so that the programming process may fetch an attribute value for that object. With reference to the same display screen shown in FIG. 4, the user has made a selection of object 80. By moving his cursor in a gesture (not shown) under control of mouse 26, FIG. 1 to the object 80. In the present control system, this selection gesture merely involved hovering (maintaining the cursor without clicking the mouse in the vicinity of object icon 80 for a brief time period set by the program). As a result, the packets transmitted attribute value, i.e. numerical data indicative of transmitted packets appears in the transient display area 88 for object 80. As will be hereinafter described with respect to the flowcharts of FIGS. 7 and 8, this value may obtained from any appropriate database 71–79 in FIG. 2 or it may be dynamically calculated from data in one or more of these databases. In addition, the attribute values may be retrieved via a network information protocol such as SNMP (Simple Network Management Protocol), DMI (Desktop Management Interface) or WEBM (Web Management).

Figure 5:
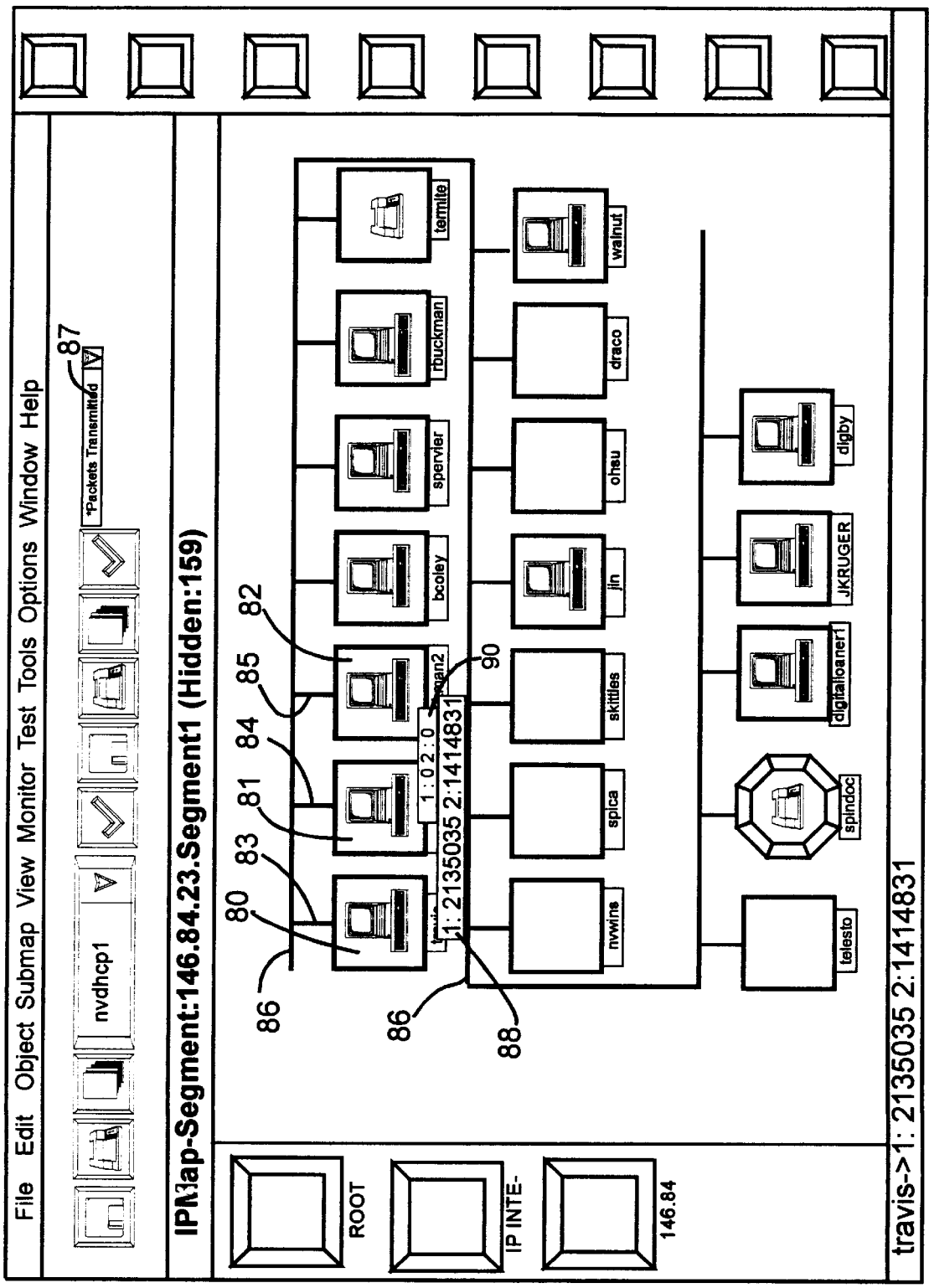
FIG. 5 is the display screen of FIG. 4 after a second object has been selected and the value of the selected attribute of the second object is also transiently displayed.

The key aspect of the present invention involves creating displays of varying transience. The system may be set up to select and set up the time of transience based upon the time that the user hovers the cursor above the selected object. For example, lets us assume two selectable periods of varying transience for the displays: 1) a shorter transience time of 20 seconds is set up by hovering the cursor for 0.3 seconds and 2) a longer transience of 1 minute is set up by hovering the cursor above the selected object for 3 seconds. The system program uses conventional means for setting the time that the transient display 88 will be on. In the present example, the user has hovered the cursor for the longer period of 3 seconds and consequently the transient display will be on for the longer period of 1 minute. Meanwhile as shown in FIG. 5, the user has selected another object 81 and has hovered the cursor above object 81 for the shorter 0.3 second time thereby resulting in the transient display 90 containing the "packets transmitted" value of object being shown for only 20 seconds. Now with reference to FIG. 6, a subsequent object has been selected, object 82 and a transient display 89 has been set up for it for the longer time period as previously described. It should be noted that while the longer transient display 88 for object 80 is still present, the shorter transient display for object 81 has disappeared.

Figure 7:
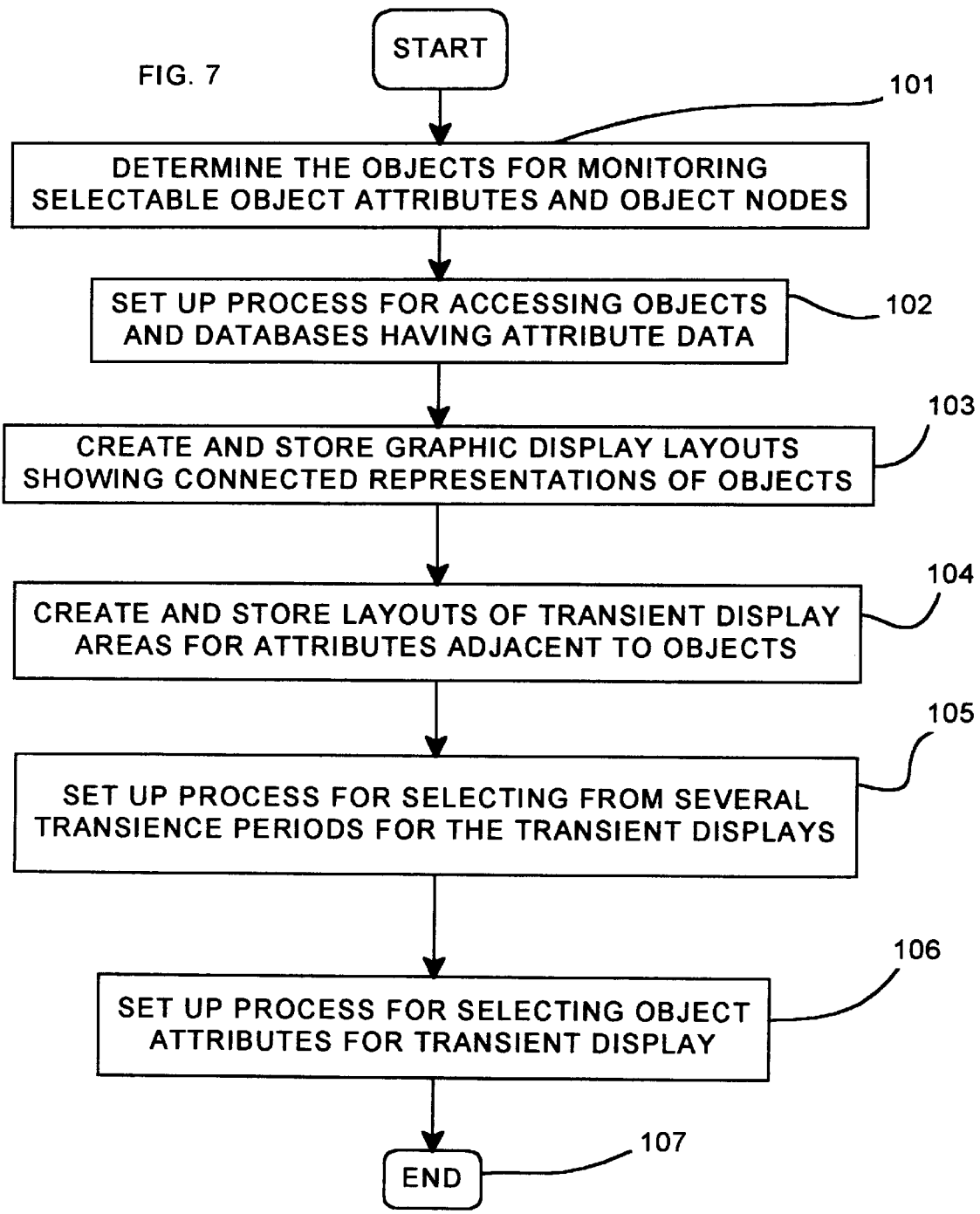
FIG. 7 is a flowchart showing the development of a transient display process of the present invention.
Figure 8:
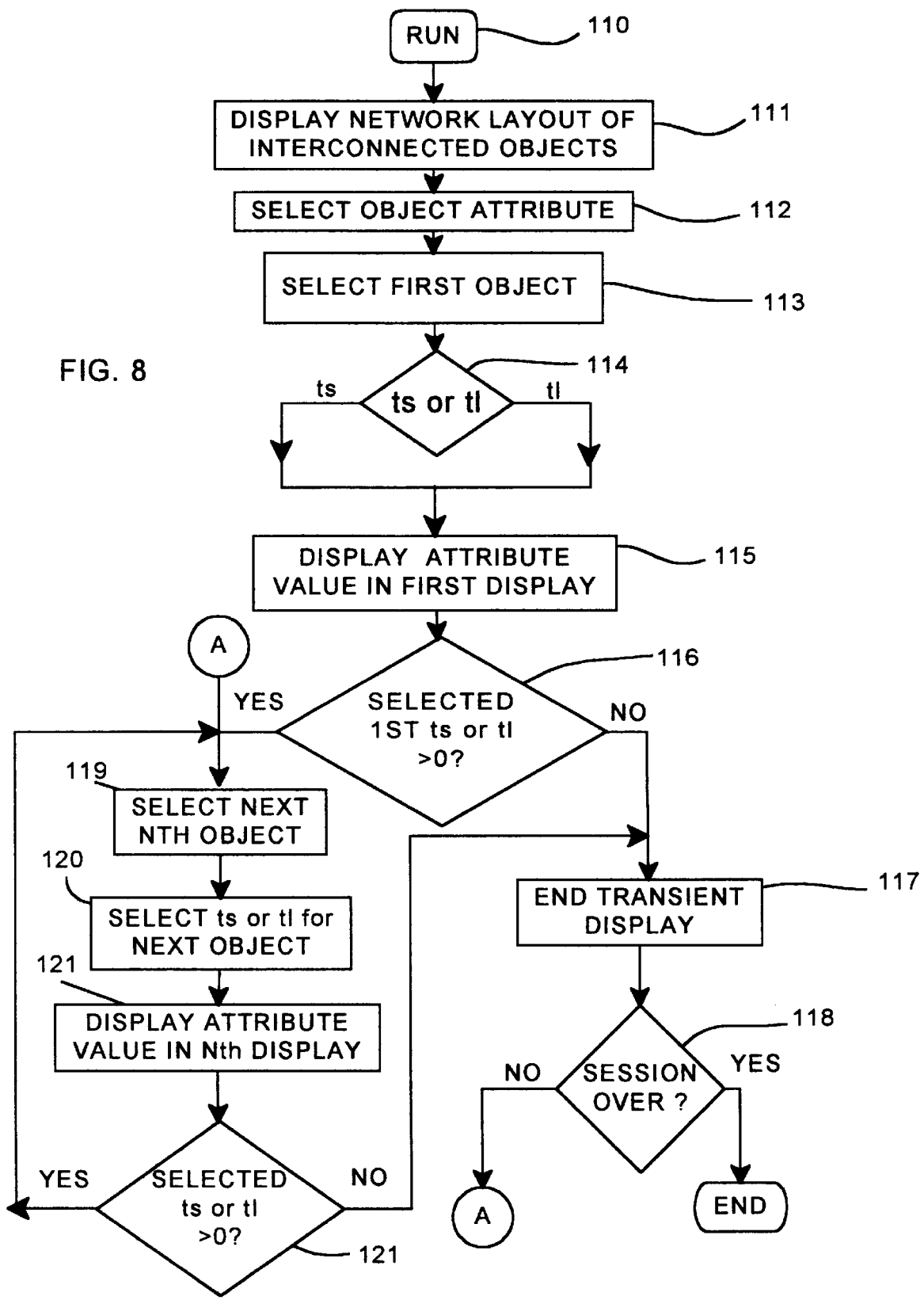
FIG. 8 is a flowchart showing the running of the transient display process described with respect to FIG. 7.

Now with reference to FIGS. 7 and 8, we will describe a process implemented by the present invention in conjunction with the flowcharts of these figures. FIG. 7 is a flowchart showing the development of a transient display process of the present invention. FIG. 8 is a flowchart showing the running of the transient display process described with respect to FIG. 7.

Figure 4:
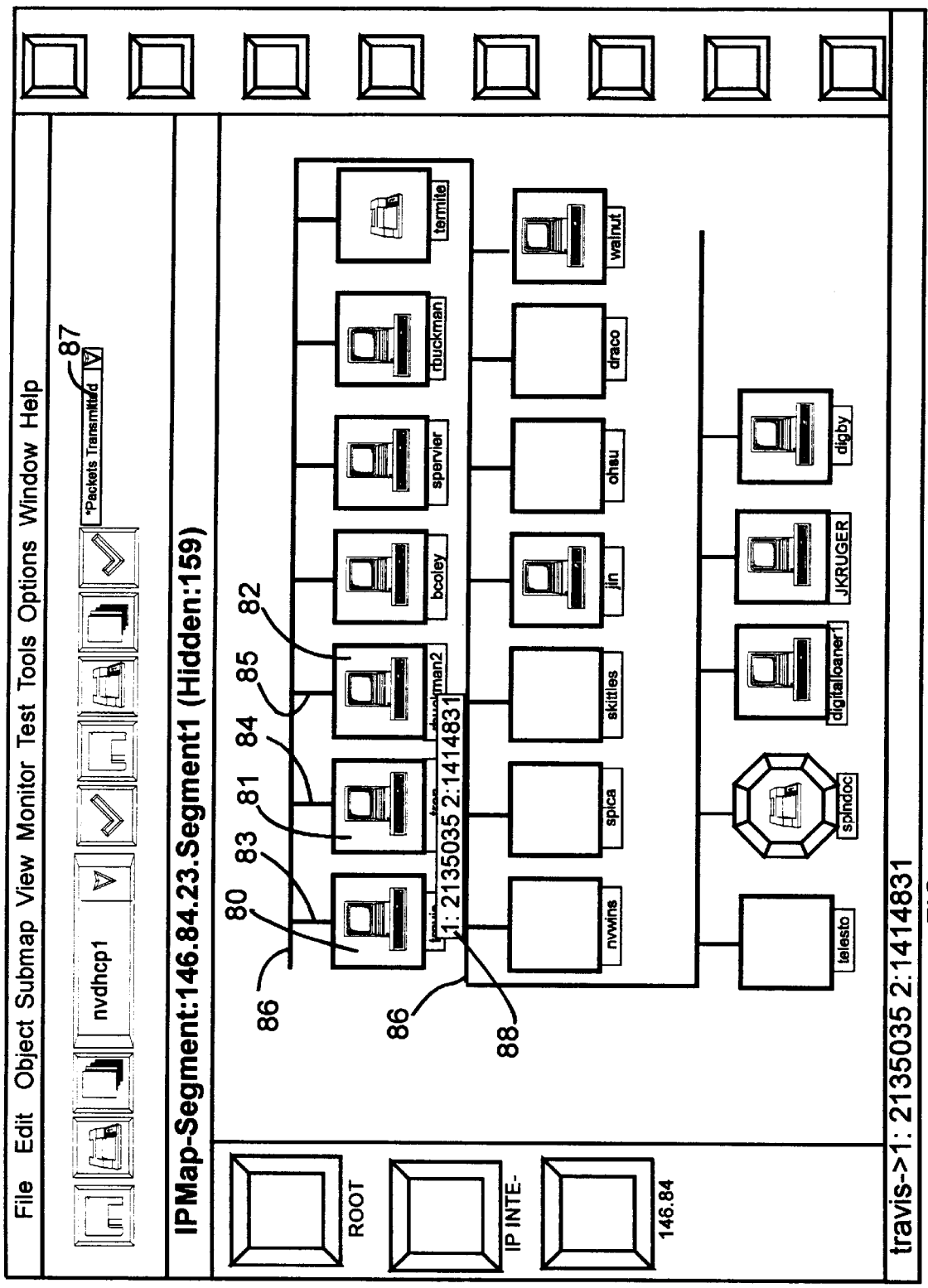
FIG. 4 is the display screen view of FIG. 3 with the value of a selected attribute of a first designated object transiently displayed.
Figure 6:
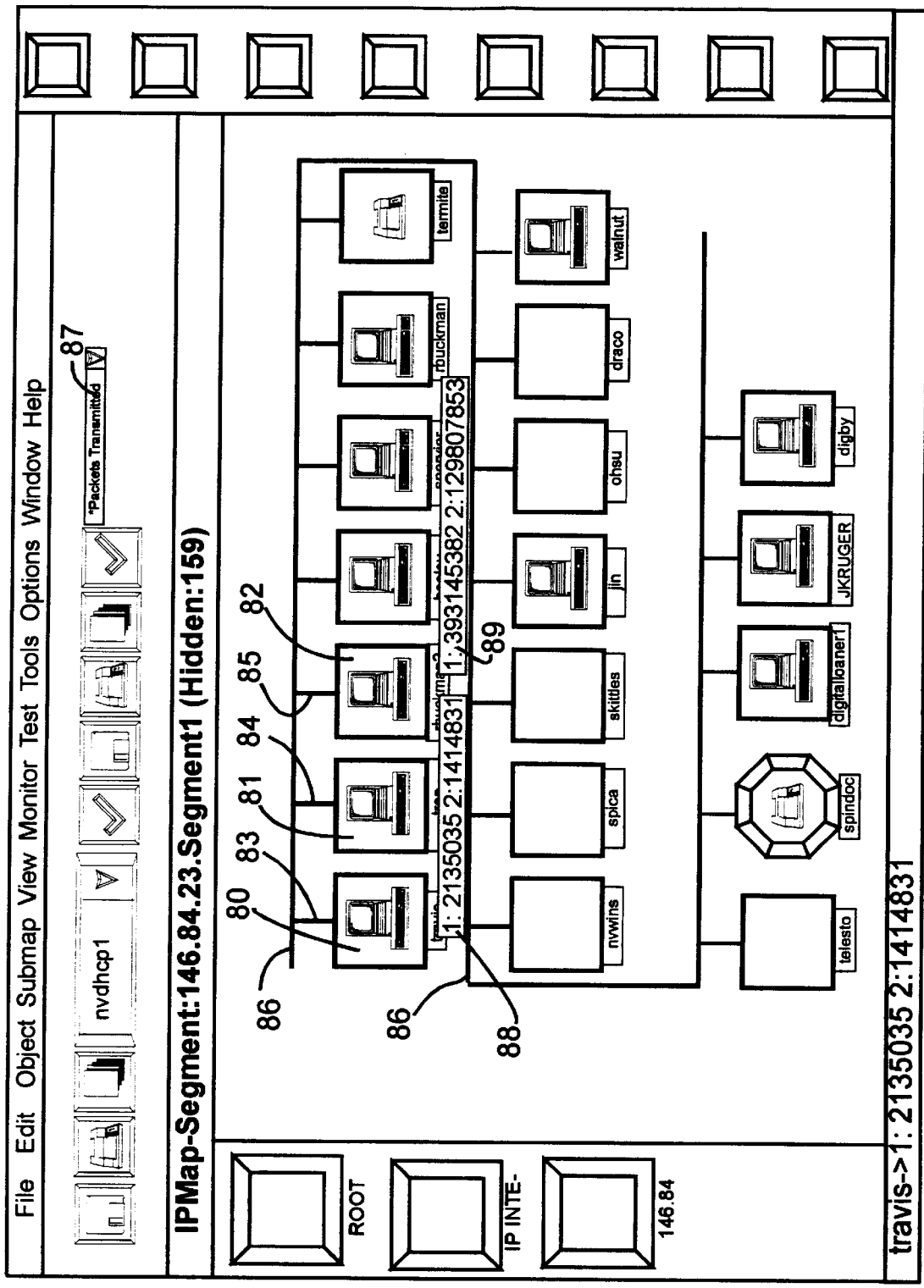
FIG. 6 is the display screen of FIG. 5 after a third object has been selected and the value of the selected attribute of the third object is transiently displayed together the continued longer term transience of the first object display while the shorter transience display associated with the second object has disappeared.

With reference to FIG. 7, first, process step 101, in developing the program, a determination should be made as to which objects are to be monitored for attributes. It could range from a major internet portion objects, FIG. 2, to a local network having a handful of objects. Next, step 102, a program process for accessing the attribute data for the objects is created and stored. For simplicity in illustration, the attribute data could be considered as stored in the databases 71 through 79, FIG. 2, associated with the various objects. Accessing of the databases and the fetching of attribute data could involve any conventional network routines for data acquisition. The display screen layouts of icons representative of objects together with appropriate interconnections as in the illustrative layouts of FIGS. 3–6 using conventional user interfaces provided by operating systems such as "Windows 95", (a TM of Microsoft Corp.) or "X-Windows", step 103 are created and stored. Then, step 104, using the same layout design program, layouts for the transient displays such as those in FIGS. 4–6 are developed. Next, step 105, a process is set for selecting from several periods of transience for each transient display, which transience is to be set for showing the attribute value of a selected object. Making the transience period determined by the period of hovering a cursor as described above is an effective procedure. However, the period of transience could be preset for each of the transient fields.

Also, a procedure is set up through which the user will be able to interactively select through interfaces such as those of FIGS. 3–6, objects and their attributes in a dynamic manner, step 106. This ends 107 the program set up. The running of the process will now be described with respect to FIG. 8. In following some typical routines, the step in FIG. 8 will given together with a reference to the display screen of FIGS. 3–6 which best illustrates the step. The program is run, step 110, and a network layout is displayed, step 111, as in FIG. 3. Next, step 112, an object attribute is selected as "Packets Transmitted" in the FIGS. 3 and 4 displays. Then, step 113, an object is selected, object 80, FIG. 4 layout which sets off a transient display of the value of the selected attribute for the selected object, i.e., transient display 88. At this point, decision step 114, a selection of the short or long transience period is made and an appropriate timer for the selected short: "ts" or long: "tl" period is made, after which the attribute value for that object 80 (FIG. 4) is shown in a transient display such as display 88. Then as in decision step 116, a determination is made as to whether time remains. If Yes, the procedure goes to step 119, another object is selected, a period of transience selected, step 120, and the value of the attribute displayed in a subsequent display, step 121. This is transient display 90 for object 81 in FIG. 5. Since as set forth, earlier in the flow description, transient display 88 has not timed out as yet, both transient displays 88 and 90 are both present. At this point, a determination is made, decision step 122 as to whether the second transient display i.e., display 90, FIG. 5 has timed out. As we previously described transient display 90 has timed out because it was selected for the short period of transience. Therefore, the flow goes to step 117, FIG. 8 and display 90 is ended as shown in FIG. 6. At this point, decision step 118, a determination is made as to whether the session is over. If it is, the session is ended. However, in the present example, assume that the session is not over. It proceeds back to step 119 via branch "A", and the next object is selected. In the present example, this is object 82, FIG. 6. By the previously described hovering technique, a transience period is selected, step 120 and the attribute value for object 82 is displayed in the nth transient display i.e., display 89. Thus transient displays 88 and 89 remain commonly displayed while transient display 90 which had been displayed intermediately for a short transience period has disappeared.

Although certain preferred embodiments have been shown and described, it will be understood that many changes and modifications may be made therein without departing from the scope and intent of the appended claims.

We claim:

1. In a computer managed communication network with user interactive access via a plurality of display terminals and including a plurality of network objects, each respectively associated with one of a plurality of linked network nodes, means for storing data representing attributes of said network objects, means for graphically displaying on at least one of said display terminals, at least a portion of said linked network nodes and associated objects, user interactive means for activating for each of a plurality of said displayed objects, a respective transient display of a selected attribute of said displayed object proximate to said object during a period of common transience, and user interactive means for selecting the attributes to be transiently displayed.

2. The computer managed communication network of claim 1, wherein the selected attribute is common to said plurality of objects.

3. The computer managed communication network of claim 1, further including user interactive means for varying the period of transience of each of said transient displays.

4. The computer managed communication network of claim 2, further including user interactive means for varying the period of transience of each of said transient displays.

5. The computer managed communication network of claim 4, wherein said user interactive means for activating said transient displays include said means for varying the period of transience.

6. The computer managed communication network of claim 5, wherein said means for activating said transient displays comprise means for hovering a cursor proximate to a selected object for a predetermined time period.

7. A method for determining the status of attributes of a plurality of network objects each respectively associated with one of a plurality of linked network nodes in a computer managed communication network with user interactive access via a plurality of display terminals comprising:

storing data representing attributes of said network objects, graphically displaying on at least one of said display terminals, at least a portion of said linked network nodes and associated objects, and activating for each of a plurality of said displayed objects a respective transient display of a selected attribute of said displayed object proximate to said object during a period of common transience.

8. A method according to claim 7, wherein the selected attribute is common to said plurality of objects.

9. A method according to claim 7, further including the step of user interactively varying the period of transience of each of said transient displays.

10. A method according to claim 8, further including the step of user interactively varying the period of transience of each of said transient displays.

11. A method according to claim 10 wherein said transient display is activated hovering a cursor proximate to a selected object for a predetermined time period.

12. A computer program for a computer managed communication network with user interactive access via a plurality of display terminals and including a plurality of network objects, each respectively associated with one of a plurality of linked network nodes, said program having data structures included on a computer readable medium comprising:

means for storing data representing attributes of said network objects, means for graphically displaying on at least one of said display terminals, at least a portion of said linked network nodes and associated objects, user interactive means for activating for each of a plurality of said displayed objects, a respective transient display of a selected attribute of said displayed object proximate to said object during a period of common transience, and user interactive means for selecting the attributes to be transiently displayed.

13. The computer program according to claim 12, wherein the selected attribute is common to said plurality of objects.

14. The computer program according to claim 12, further including user interactive means for varying the period of transience of each of said transient displays.

15. The computer program according to claim 13, further including user interactive means for varying the period of transience of each of said transient displays.

16. The computer program according to claim 15, wherein said user interactive means for activating said transient displays include said means for varying the period of transience.

17. The computer program according to claim 16, wherein said means for activating said transient displays comprise means for hovering a cursor proximate to a selected object for a predetermined time period.

18. A computer implemented method for displaying user interactive objects comprising:

displaying a plurality of selectable user interactive objects;

storing data representing attributes of the objects; and upon selection of one of the objects, displaying a plurality of transient displays of an attribute of the selected object, wherein each of the transient displays has a different period of transience.

19. A user interactive computer controlled display system comprising:

means for displaying a plurality of selectable user interactive objects, means for storing data representing attributes of said objects, user interactive means for activating for each of a plurality of said displayed objects, a transient display of a selected attribute of said displayed object proximate to said object during a period of variable transience, means for varying the transience of said transient display, and user interactive means for selecting the attribute to be transiently displayed.

20. A computer implemented method for displaying user interactive objects comprising:

displaying a plurality of selectable user interactive objects, storing data representing attributes of said objects, activating for at least one of said displayed objects, a transient display of a selected attribute of said displayed object proximate to said object during a period of variable transience, varying the transience of said transient display, and selecting the attribute to be transiently displayed.

21. A computer program for a computer controlled interactive display system having data structures included on a computer readable medium comprising:

means for displaying a plurality of selectable user interactive objects, means for storing data representing attributes of said objects, user interactive means for activating for each of a plurality of said displayed objects, a transient display of a selected attribute of said displayed object proximate to said object during a period of variable transience, means for varying the transience of said transient display, and user interactive means for selecting the attribute to be transiently displayed.

22. In a computer managed communication network with user interactive access via a plurality of display terminals and including a plurality of network objects, each respectively associated with one of a plurality of linked network nodes, means for storing data representing attributes of said network objects;

means for graphically displaying on at least one of said display terminals, at least a portion of said linked network nodes and associated objects;

user interactive means for activating for each of a plurality of said displayed objects, a respective transient display of a selected attribute common to said plurality of objects proximate to said object during a variable period of common transience having:

user interactive means for varying the period of transience of each of said transient displays including:

means for hovering a cursor proximate to a selected object, and means for setting a plurality of predetermined time periods for said hovering of said cursor, each of said predetermined periods of hovering resulting in a different period of transience of the display for the object of said hovered cursor; and user interactive means for selecting the attributes to be transiently displayed.

23. A method for determining the status of attributes of a plurality of network objects each respectively associated with one of a plurality of linked network nodes in a computer managed communication network with user interactive access via a plurality of display terminals comprising:

storing data representing attributes of said network objects;

graphically displaying on at least one of said display terminals, at least a portion of said linked network nodes and associated objects;

activating for each of a plurality of said displayed objects, a respective transient display of a selected attribute common to said plurality of objects proximate to said object during a variable period of common transience by steps including:

varying the period of transience of each of said transient displays by hovering a cursor proximate to a selected object for a predetermined time period, and setting a plurality of said predetermined time periods for hovering of said cursor, each of said predetermined periods of hovering resulting in a different period of transience of the display for the object of said hovered cursor, and selecting the attributes to be transiently displayed.

24. A computer program for a computer managed communication network with user interactive access via a plurality of display terminals and including a plurality of network objects, each respectively associated with one of a plurality of linked network nodes, said program having data structures included on a computer readable medium comprising:

means for storing data representing attributes of said network objects;

means for graphically displaying on at least one of said display terminals, at least a portion of said linked network nodes and associated objects;

user interactive means for activating for each of a plurality of said displayed objects, a respective transient display of a selected attribute common to said plurality of objects proximate to said object during a variable period of common transience having:

user interactive means for varying the period of transience of each of said transient displays including:

means for hovering a cursor proximate to a selected object, and means for setting a plurality of predetermined time periods for hovering of said cursor, each of said predetermined periods of hovering resulting in a different period of transience of the display for the object of said hovered cursor, and user interactive means for selecting the attributes to be transiently displayed.

* * * * *